May 11, 1965  R. H. SHENK  3,182,567

CLUTCH ACTUATING MECHANISM

Filed Aug. 30, 1962

INVENTOR.
ROBERT H. SHENK
BY
Charles L Lovenhul
attorney

United States Patent Office 3,182,567
Patented May 11, 1965

3,182,567
CLUTCH ACTUATING MECHANISM
Robert H. Shenk, Erie, Pa., assignor to Zurn Industries, Inc., Erie, Pa., a corporation of Pennsylvania
Filed Aug. 30, 1962, Ser. No. 220,430
9 Claims. (Cl. 92—138)

This invention relates to shifting devices and, more particularly, to shifting devices for use in gear clutch arrangements and the like.

This application constitutes an improvement over patent application, Serial No. 762,289, filed September 22, 1958, which issued on May 14, 1963 as Patent No. 3,089,575 and discloses an improved actuating member.

Figure 1:
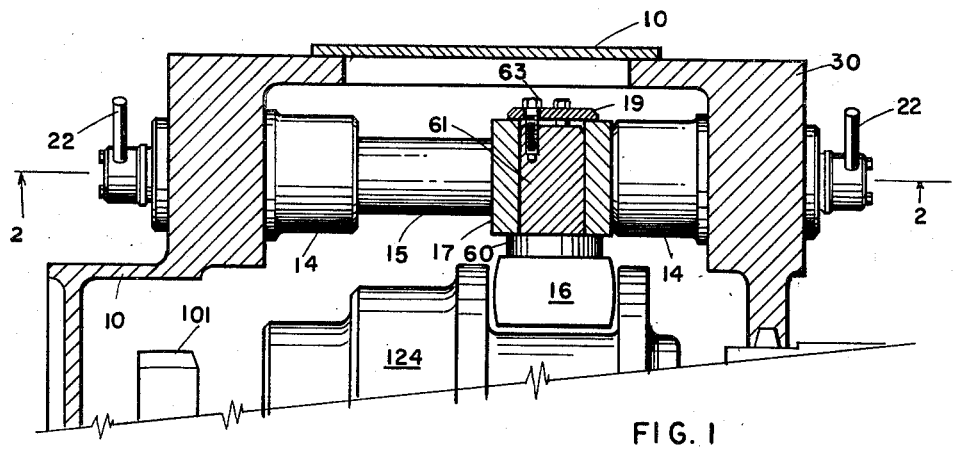

FIG. 1 of the said patent application shows an actuating member having two cylinders received in apertures in the sides of the housing.

The present invention utilizes two pair of spaced aligned cylinders which receive two pistons. The pistons are each in the form of a solid cylinder. A yoke connects the two cylinders and it receives a roller similar to one of the rollers in the said patent application.

The rollers in the said patent application do not apply a force to the ring uniformly but all of the load is taken on either one or the other. The arrangement of cylinders herein and the improved structure thereof make the present device simple, easy to construct, and easy to assemble and its simplicity renders it economical to manufacture and to maintain.

It is, accordingly, an object of the present invention to provide an improved actuating mechanism for use in combination with a clutch transmission.

Another object of the invention is to provide an improved actuating mechanism for a synchronizing clutch.

A further object of the invention is to provide an actuating mechanism for a synchronizing clutch which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
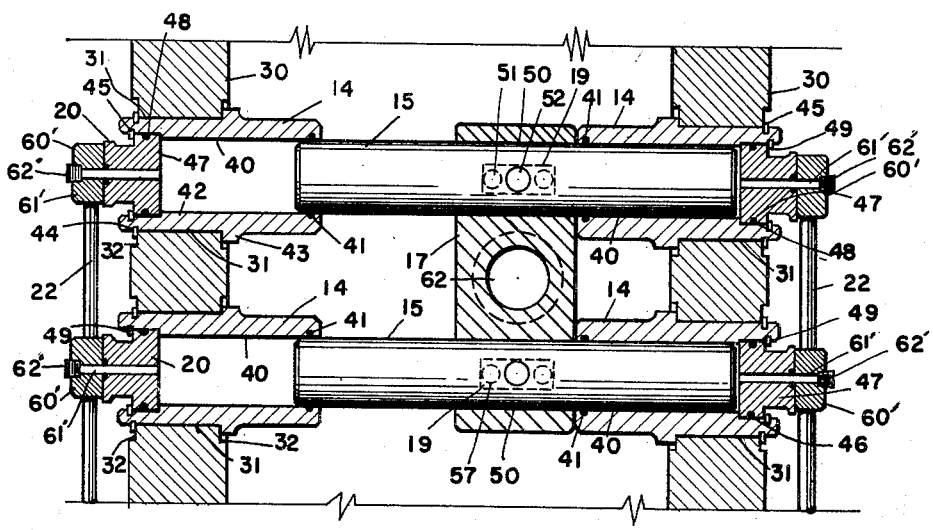

In the drawing:

FIG. 1 is a cross sectional view of an actuating device according to the invention similar to the corresponding parts thereof shown in FIG. 5 of the said patent application; and FIG. 2 is a cross sectional view taken on line 2—2 of FIG. 1.

Now with more particular reference to the drawing, the actuating mechanism is suitable for support on a housing such as housing 15 of the synchronizing clutch shown in the said patent application. A shifting element 124 in the present application corresponds to the shifting element 124 in the said application and a rotating gear 101 herein corresponds to the gear 101 in the said application. A roller 16 herein corresponds to roller 55 in the said application and cylinders 14 herein correspond to cylinders 59 and 60 in the said application.

The present invention utilizes a single roller spaced between the pistons instead of the two rollers as shown in the said application. A frame 10 herein has heavy structural members 30 supported thereon and these structural members have holes 31 formed therein. These holes are counterbored at 32 at their opposite ends thereof.

The cylinders 14 have an internal cylindrical bore 40 which slidingly receives the ends of pistons 15. The ends of the cylinders 14 adjacent the pistons have grooves formed therein which receive O-rings 41 and the O-rings form a seal with the outer cylindrical peripheries of the pistons 15. The cylinders have a finished outer cylindrical portion 42 which is received in the holes 31 and this cylindrical portion terminates at the shoulder adjacent a flange 43. The flange 43 is received in the counterbores 32.

The cylinders 14 have an external peripheral groove 44 which receives snap rings 45. The snap rings 45 hold the cylinders firmly in the holes 31.

The pistons 15 are in the form of straight right cylindrical rods having a finished outside surface which is received in the cylinders 14. The pistons are received in spaced bores in a yoke 17 and are clamped therein by a taper pin 52 which extends through the yoke and through the pistons. The taper pin is held in place by a taper pin plate which is, in turn, held in place by studs 51.

The cam follower or roller 16 is supported on an axle 60 which has a reduced size portion 61 received in a bore 62 in the yoke 17. The reduced size portion 61 threadably receives bolts 63 which hold a cover plate 19 in position. It will be observed that the reduced size portion 61 is slightly shorter than the thickness of the yoke 17 at this point so that there is a space between the cover plate 19 and the end of the reduced size portion 61. Therefore, the bolts 63 exert a force on the reduced size portion, holding it firmly in the bores.

The cylinders 14 have a counterbore 46 which receives a flange 47 on a cylinder head 20. The flange 47 has a groove therein which receives O-rings 48 and these O-rings form a seal between the cylinder head and the cylinders. The counterbores in the cylinders which receive the flange 47 have an internal peripheral groove therein which receives a snap ring or spring washer 49. The spring washer 49 holds the cylinder head 20 in position.

Cylinder head flanges 60' receive pipes 22. The pipes 22 communicate with passages 61' and the outer ends of the passages are closed by pressure socket head screws 62'.

It will be seen that when fluid under pressure is introduced through the pipe 22 on the right, it will enter the chamber inside the cylinder and force the pistons 15 with the yoke attached thereto to the left, thereby shifting the element 124 to the left. When pressure is introduced to the other cylinders, it will force the pistons to the right, moving the yoke to the right with it.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An actuating device for a synchronizing clutch comprising a frame having a first and a second fixed member spaced from each other, two holes in each said fixed member, the holes in one said fixed member being aligned with the holes in the other said fixed member, cylinders each having an internal bore disposed in each said hole with the bore of each said cylinder aligned with another said cylinder bore, means engaging said cylinders and said fixed members holding said cylinders in place on said fixed members, two elongated cylindrical shaped pistons, the ends of each said piston being slidably received in said cylinders bore, a yoke having two spaced holes therein each receiving an intermediate part of one said piston, head means closing the end of each said cylinder remote from said piston, means to inject fluid into said cylinders, means fixing said pistons to said yoke, sealing means between said cylinders and said pistons, and a roller member on said yoke intermediate said pistons.

2. The device recited in claim 1 wherein said sealing means comprises an internal peripheral groove in each said cylinder remote from said head means and an O-shaped sealing washer in each said groove forming sliding sealing engagement with said pistons.

3. The device recited in claim 1 wherein said head means comprises a generally cylindrical member having a flange received in a counterbore in each said cylinder, an O-shaped sealing washer in each said counterbore in each said head member, an internal peripheral groove in each said cylinder in said counterbore therein, a spring washer in each of said grooves extending radially inwardly therefrom overlying said flanges on said head members holding said head members in said counterbores, and a bore in each said head member forming a passage for said fluid.

4. The device recited in claim 1 wherein said roller member is rotatable about an axis perpendicular to the axes of said pistons, an axle member receives said roller member and has a reduced size portion, said reduced size portion being received in a central bore in said yoke, a cover plate over said central bore, and means attaching said reduced size portion to said plate.

5. An actuating device for a synchronizing clutch comprising a frame having a first and a second fixed member spaced from each other, two holes in each said fixed member, the holes in one said fixed member being aligned with the holes in the other said fixed member, cylinders each having an internal bore disposed in each said hole with the bore of each said cylinder aligned with another said cylinder bore, means engaging said cylinders and said fixed members holding said cylinders in place on said fixed members, two elongated cylindrical shaped pistons, each of the ends of each said piston being slidably received in said cylinder bores, a yoke having two spaced holes therein each receiving an intermediate part of one said piston, head means closing the end of each said cylinder remote from said piston, means to inject fluid into said cylinders, means fixing said pistons to said yoke, sealing means between said cylinders and said pistons, a roller member on said yoke intermediate said pistons, said sealing means comprising an internal peripheral groove in each said cylinder remote from said head means, an O-shaped sealing washer in each said groove forming sliding sealing engagement with said pistons, said head means comprising a generally cylindrical member having a flange received in a counterbore in each said cylinder, a spring washer in each of said grooves extending radially inwardly therefrom overlying said flanges on said head members in said counterbores, and a bore in each said head member forming a passage for said fluid.

6. An actuating device for a synchronizing clutch comprising a frame having a first and a second fixed member spaced from each other, two holes in each said fixed member, the holes in one said fixed member being aligned with the holes in the other said fixed member, cylinders each having an internal bore disposed in each said hole with the bore of each said cylinder aligned with another said cylinder bore, means engaging said cylinders and said fixed members holding said cylinders in place on said fixed members, two elongated cylindrical shaped pistons, each of the ends of each said piston being slidably received in said cylinder bores, a yoke having two spaced holes therein each receiving an intermediate part of one said piston, head means closing the end of each said cylinder remote from said piston, means to inject fluid into said cylinders, means fixing said pistons to said yoke, sealing means between said cylinders and said pistons, a roller member on said yoke intermediate said pistons, said head means comprising a generally cylindrical member having a flange received in a counterbore in each said cylinder, an internal peripheral groove in each said cylinder in said counterbore therein, an O-shaped sealing washer in each said groove in each said cylindrical member, a spring washer in each of said grooves extending radially inwardly therefrom overlying said flanges on said cylindrical members holding said cylindrical members in said counterbores, a bore in each cylindrical member forming a passage for said fluid, said roller member being rotatable about an axis perpendicular to the axes of said pistons, an axle member receiving said roller member and having a reduced size portion, said reduced size portion being received in a central bore in said yoke, a cover plate over said central bore, and means attaching said reduced size portion to said fixed members.

7. An actuating device for a synchronizing clutch comprising a frame having a first and a second fixed member spaced from each other, two holes in each said fixed member, the holes in one said fixed member being aligned with the holes in the other said fixed member, cylinders each having an internal bore disposed in each said hole with the bore of each said cylinder aligned with another said cylinder bore, means engaging said cylinders and said fixed members holding said cylinders in place on said fixed members, two elongated cylindrical shaped pistons, each of the ends of each said piston being slidably received in said cylinder bores, a yoke having two spaced holes therein each receiving an intermediate part of one said piston, head means closing the end of each said cylinder remote from said piston, means to inject fluid into said cylinders, means fixing said pistons to said yoke, sealing means between said cylinders and said pistons, a roller member on said yoke intermediate said pistons, said roller member being rotatable about an axis perpendicular to the axes of said pistons, an axle member receiving said roller member and having a reduced size portion, said reduced size portion being received in a central bore in said yoke, a cover plate over said central bore, and means attaching said reduced size portion to said fixed members.

8. An actuating device for a synchronizing clutch comprising a frame having a first and a second fixed member spaced from each other, two holes in each said fixed member, the holes in one said fixed member being aligned with the holes in the other said fixed member, cylinders each having an internal bore disposed in each said hole with the bore of each said cylinder aligned with another said cylinder bore, means engaging said cylinders and said fixed members holding said cylinders in place on said fixed members, two elongated cylindrical shaped pistons, each of the ends of each said piston being slidably received in said cylinder bores, a yoke having two spaced holes therein each receiving an intermediate part of one said piston, head means closing the end of each said cylinder remote from said piston, means to inject fluid into said cylinders, means fixing said pistons to said yoke, sealing means between said cylinders and said pistons, a follower on said yoke intermediate said pistons, said sealing means comprising an internal peripheral groove in each said cylinder remote from said head means, an O-shaped sealing washer in each said groove forming sliding sealing engagement with said pistons, said follower comprising a roller rotatable about an axis perpendicular to the axes of said pistons, an axle member receiving said roller and having a reduced size portion, said reduced size portion being received in a central bore in said yoke, a cover plate over said central bore, and means attaching said reduced size portion to said plate.

9. An actuating device for a synchronizing clutch comprising a frame having a first and a second fixed member spaced from each other, two holes in each said fixed member, the holes in one said fixed member being aligned with the holes in the other said fixed member, cylinders each having an internal bore disposed in each said hole with the bore of each said cylinder aligned with another said cylinder bore, means engaging said cylinders and said fixed members holding said cylinders in place on said fixed members, two elongated cylindrical shaped pistons, each of the ends of each said piston being slidably received in said cylinder bores, a yoke having two spaced holes therein each receiving an intermediate part of one said piston, head means closing the end of each said cylinder remote from said piston, means to inject fluid into said cylinders, means fixing said pistons to said yoke, sealing means between said cylinders and said pistons, a follower on said yoke intermediate said pistons, said sealing means comprising an internal peripheral groove in each said cylinder remote from said head means, an O-shaped sealing washer in each said groove forming sliding sealing engagement with said pistons, said head means comprising a generally cylindrical member having a flange received in a counterbore in each said cylinder, a spring washer in each of said grooves extending radially inwardly therefrom overlying said flanges on said cylindrical members holding said cylindrical members in said counterbores, a bore in each said cylindrical member forming a passage for said fluid, said follower comprising a roller rotatable about an axis perpendicular to the axes of said pistons, an axle member receiving said roller and having a reduced size portion, said reduced size portion being received in a central bore in said yoke, a cover plate over said central bore, and means attaching said reduced size portion to said fixed members.

References Cited by the Examiner

UNITED STATES PATENTS

| | | | |
|---|---|---|---|
| 995,423 | 6/11 | Ellis | 121—120 |
| 1,677,112 | 7/28 | Anderson | 92—138 |
| 1,697,723 | 1/29 | Gigli | 123—56 X |
| 2,124,604 | 7/38 | Bidwell. | |
| 2,158,419 | 5/39 | Grover. | |
| 2,188,630 | 1/40 | Grahman. | |
| 2,640,573 | 6/53 | Shenk | 192—53 |
| 2,690,939 | 10/54 | Whaley | 220—46 |
| 2,698,603 | 1/55 | Macweka | 121—38 |
| 2,724,368 | 11/55 | Miller | 121—38 |
| 2,865,693 | 12/58 | Barnhart | 220—46 |
| 2,896,581 | 7/59 | Rowles et al. | 121—38 |
| 2,915,046 | 12/59 | Larsen et al. | 121—46 |
| 3,080,152 | 3/63 | Lendved | 121—120 X |

RICHARD B. WILKINSON, *Primary Examiner.*

FRED E. ENGELTHALER, *Examiner.*